(12) United States Patent
Ichimaru et al.

(10) Patent No.: US 12,246,987 B2
(45) Date of Patent: Mar. 11, 2025

(54) REINFORCED GLASS, AND METHOD FOR PRODUCING REINFORCED GLASS

(71) Applicant: Nippon Electric Glass Co., Ltd., Shiga (JP)

(72) Inventors: Tomonori Ichimaru, Shiga (JP); Kiyotaka Kinoshita, Shiga (JP); Ken Yuki, Shiga (JP); Ryota Suzuki, Shiga (JP); Yuta Nagano, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 859 days.

(21) Appl. No.: 17/282,823

(22) PCT Filed: Oct. 8, 2019

(86) PCT No.: PCT/JP2019/039647
§ 371 (c)(1),
(2) Date: Apr. 5, 2021

(87) PCT Pub. No.: WO2020/075709
PCT Pub. Date: Jun. 16, 2020

(65) Prior Publication Data
US 2021/0371332 A1 Dec. 2, 2021

(30) Foreign Application Priority Data
Oct. 9, 2018 (JP) .................. 2018-191054
Dec. 11, 2018 (JP) .................. 2018-231539
(Continued)

(51) Int. Cl.
B32B 15/04 (2006.01)
B32B 17/06 (2006.01)
(Continued)

(52) U.S. Cl.
CPC ............ *C03C 21/002* (2013.01); *C03C 3/085* (2013.01); *C03C 3/097* (2013.01)

(58) Field of Classification Search
CPC .................................................. C03C 21/002
(Continued)

(56) References Cited

U.S. PATENT DOCUMENTS 9,718,727 B2 * 8/2017 Bookbinder .......... C03C 23/007
10,442,730 B2 * 10/2019 Allan ........................ C03C 4/18
(Continued)

FOREIGN PATENT DOCUMENTS

JP 2011-527661 11/2011
JP 2015-511573 4/2015
(Continued)

OTHER PUBLICATIONS

International Preliminary Report on Patentability and Written Opinion of the International Searching Authority issued Apr. 8, 2021 in International (PCT) Patent Application No. PCT/JP2019/039647.
(Continued)

*Primary Examiner* — Lauren R Colgan
(74) *Attorney, Agent, or Firm* — Wenderoth, Lind & Ponack, L.L.P.

(57) ABSTRACT

A tempered glass has a surface and a thickness. When a compressive stress of the tempered glass is represented by a positive number and a tensile stress thereof is represented by a negative number, the compressive stress at the surface is 400 MPa or more, a stress profile of the tempered glass obtained by measuring a stress in a depth direction from the surface has inflection points at each of which a second derivative of the stress profile becomes zero between the surface and a depth equal to half of the thickness, and the compressive stress value at a first inflection point at a position closest to the surface among the inflection points is
(Continued)

150 MPa or less. The compressive stress at a second inflection point at a position deeper than the first inflection point is 45 MPa or less.

12 Claims, 5 Drawing Sheets

(30) Foreign Application Priority Data

| Dec. 25, 2018 | (JP) | 2018-240718 |
|---|---|---|
| May 22, 2019 | (JP) | 2019-096352 |
| May 23, 2019 | (JP) | 2019-096572 |
| Aug. 6, 2019 | (JP) | 2019-144811 |
| Sep. 10, 2019 | (JP) | 2019-164611 |

(51) Int. Cl.
  *C03C 3/085* (2006.01)
  *C03C 3/097* (2006.01)
  *C03C 21/00* (2006.01)

(58) Field of Classification Search
  USPC .................................................. 428/426, 410
  See application file for complete search history.

(56) References Cited

U.S. PATENT DOCUMENTS

| 11,760,688 | B2* | 9/2023 | Lee | C03C 21/002 |
| | | | | 65/30.14 |
| 2010/0009154 | A1* | 1/2010 | Allan | C03C 3/093 |
| | | | | 501/67 |
| 2010/0167091 | A1 | 7/2010 | Tachiwana et al. | |
| 2012/0321898 | A1 | 12/2012 | Meinhardt et al. | |
| 2013/0224492 | A1* | 8/2013 | Bookbinder | C03C 21/002 |
| | | | | 65/30.14 |
| 2014/0370264 | A1 | 12/2014 | Ohara et al. | |
| 2015/0239776 | A1* | 8/2015 | Amin | G06F 1/1637 |
| | | | | 428/220 |
| 2016/0023944 | A1* | 1/2016 | Bookbinder | C03C 23/007 |
| | | | | 428/220 |
| 2016/0347655 | A1 | 12/2016 | Meinhardt et al. | |
| 2017/0158556 | A1* | 6/2017 | Dejneka | G06F 1/1637 |
| 2017/0197876 | A1* | 7/2017 | Oram | C03C 3/097 |
| 2017/0217824 | A1 | 8/2017 | Ohara et al. | |
| 2017/0295657 | A1* | 10/2017 | Gross | C03C 3/097 |
| 2017/0297956 | A1* | 10/2017 | Bookbinder | C03C 23/007 |
| 2017/0341973 | A1 | 11/2017 | Gross et al. | |
| 2017/0355640 | A1* | 12/2017 | Oram | C03C 4/18 |
| 2018/0037498 | A1 | 2/2018 | Ohara et al. | |
| 2018/0044232 | A1 | 2/2018 | Ohara et al. | |
| 2018/0105461 | A1* | 4/2018 | Schneider | C03C 17/30 |
| 2018/0186685 | A1 | 7/2018 | Murayama | |
| 2019/0161386 | A1* | 5/2019 | Gross | C03C 3/091 |
| 2019/0208652 | A1 | 7/2019 | Gross et al. | |
| 2019/0276355 | A1 | 9/2019 | Meinhardt et al. | |
| 2019/0375679 | A1* | 12/2019 | Gross | C03C 21/002 |
| 2020/0109083 | A1* | 4/2020 | Imakita | C03C 3/091 |
| 2020/0156993 | A1 | 5/2020 | Kinoshita et al. | |
| 2021/0061705 | A1* | 3/2021 | Jin | C03C 3/093 |
| 2022/0041493 | A1* | 2/2022 | Yuki | C03C 3/091 |

FOREIGN PATENT DOCUMENTS

| TW | 201805259 | 2/2018 |
| WO | 2007/142324 | 12/2007 |
| WO | 2013/088856 | 6/2013 |
| WO | 2013/130653 | 9/2013 |
| WO | 2017/123596 | 7/2017 |
| WO | 2017/126607 | 7/2017 |
| WO | 2017/177109 | 10/2017 |
| WO | 2019/004124 | 1/2019 |
| WO | 2019/021930 | 1/2019 |

OTHER PUBLICATIONS

Office Action issued Oct. 18, 2022 in corresponding Chinese Patent Application No. 201980066114.7, with English language translation of Chinese Search Report.
International Search Report issued Jan. 7, 2020 in International (PCT) Application No. PCT/JP2019/039647.
Notice of Reasons for Refusal issued Jul. 21, 2023 in corresponding Japanese Patent Application No. 2020-551164, with English language translation.
Office Action issued Sep. 6, 2022 in U.S. Appl. No. 17/417,523.
Office Action issued Mar. 29, 2022 in U.S. Appl. No. 17/417,523.
Request for the Submission of an Opinion issued Apr. 19, 2024 in corresponding Korean Patent Application No. 10-2021-7022729, with English translation.

\* cited by examiner

REINFORCED GLASS, AND METHOD FOR PRODUCING REINFORCED GLASS

TECHNICAL FIELD

The present invention relates to a tempered glass and a method of producing the same, and more particularly, to a tempered glass suitable for a cover glass for a cellular phone, a digital camera, a personal digital assistant (PDA), or a touch panel display, and a method of producing the same.

BACKGROUND ART

Devices such as a cellular phone (in particular, a smartphone), a digital camera, a PDA, a touch panel display, a large-screen television, and contact-less power transfer show a tendency of further prevalence. In those applications, a tempered glass obtained through ion exchange treatment has been used. In addition, in recent years, the use of the tempered glass in exterior components of a digital signage, a mouse, a smartphone, and the like is increasing.

A tempered glass includes, on its surface, a compressive stress layer formed by ion exchange treatment. Accordingly, the formation and extension of a crack in the surface are suppressed, and hence high strength is obtained. The strength of the tempered glass is considered to be capable of being improved by adjusting the formation mode of such compressive stress layer (e.g., Patent Literature 1).

CITATION LIST

Patent Literature 1: WO 2013/088856 A1

SUMMARY OF INVENTION

Technical Problem

However, the tempered glass has still room for improvement in terms of the achievement of higher impact resistance.

An object of the present invention is to provide a tempered glass having impact resistance higher than that of the related art.

Solution to Problem

According to one embodiment of the present invention, which has been devised in order to solve the above-mentioned problem, there is provided a tempered glass having a surface and a thickness T, wherein, when a compressive stress of the tempered glass is represented by a positive number and a tensile stress thereof is represented by a negative number, the compressive stress at the surface is 400 MPa or more, a stress profile of the tempered glass obtained by measuring a stress in a depth direction from the surface has inflection points at each of which a second derivative of the stress profile becomes zero between the surface and a depth equal to a half of the thickness T, and the compressive stress at a first inflection point present at a position closest to the surface among the inflection points is 150 MPa or less.

In the above-mentioned configuration, it is preferred that the inflection points comprise a second inflection point present at a position deeper than the first inflection point.

With such configuration, a stress profile in which abrupt attenuation of the compressive stress at the first inflection point or a deeper position is suppressed is obtained, and hence the tempered glass according to the one embodiment of the present invention attains higher impact resistance.

In the above-mentioned configuration, it is preferred that the compressive stress at the second inflection point be 45 MPa or less.

With such configuration, the compressive stress value at the second inflection point is reduced to reduce the tensile stress value, and hence the tempered glass according to the one embodiment of the present invention attains higher impact resistance.

In the above-mentioned configuration, it is preferred that $(\sigma 1-\sigma 2)/(d1-d2)$ be $-1.0$ MPa/μm or more, where $\sigma 1$ represents the stress at the first inflection point, $d1$ represents a depth of the first inflection point from the surface, $\sigma 2$ represents the stress at the second inflection point, and $d2$ represents a depth of the second inflection point from the surface.

With such configuration, the second inflection point is at a relatively deep position. Accordingly, a stress profile in which abrupt attenuation of the compressive stress is suppressed is obtained, and hence the tempered glass according to the one embodiment of the present invention attains higher impact resistance.

In the above-mentioned configuration, it is preferred that the depth of the first inflection point from the surface be 50 μm or less.

With such configuration, a stress profile in which the compressive stress abruptly reduces from the surface to the first inflection point is obtained to reduce the tensile stress value, and hence higher impact resistance is attained.

In the above-mentioned configuration, it is preferred that the depth of the second inflection point from the surface be 60 μm or more.

With such configuration, the second inflection point is at a relatively deep position. Accordingly, a stress profile in which abrupt attenuation of the compressive stress is suppressed is obtained, and hence the tempered glass according to the one embodiment of the present invention attains higher impact resistance.

In the above-mentioned configuration, it is preferred that the stress profile have a zero stress point at which the stress becomes zero, and the zero stress point be present at a position deeper than 12% of the thickness T from the surface.

With such configuration, a compressive stress layer is formed to range from the surface to a relatively deep position, and hence the tempered glass according to the one embodiment of the present invention attains higher impact resistance.

In the above-mentioned configuration, it is preferred that $S_{CS}/T$ be 16.0 MPa or less, where $S_{CS}$ (MPa·mm) represents an integrated value of the compressive stress from the surface to the zero stress point.

With such configuration, the integrated value of the compressive stress is reduced to a small value to reduce the tensile stress value, and hence the tempered glass according to the one embodiment of the present invention attains higher impact resistance.

In the above-mentioned configuration, it is preferred that a maximum absolute value of the tensile stress be 70 MPa or less.

In the above-mentioned configuration, it is preferred that the thickness T fall within a range of 0.3 mm or more and 1.0 mm or less, and the tempered glass have the stress profile in each of both front and back main surfaces and end surfaces thereof.

In the above-mentioned configuration, it is preferred that the thickness T fall within a range of 0.45 mm or more and 0.85 mm or less, the maximum value of the compressive stress at the surface fall within a range of 700 MPa or more and 850 MPa or less, the maximum absolute value of the tensile stress fall within a range of 42 MPa or more and 65 MPa or less, the stress profile have a zero stress point at which the stress becomes zero, the zero stress point be present at a position within a range of 17% or more and 25% or less of the thickness T from the surface, and the compressive stress at the first inflection point fall within a range of 30 MPa or more and 80 MPa or less.

In the above-mentioned configuration, it is preferred that the tempered glass comprise as a glass composition, in terms of mass %, 40% to 70% of $SiO_2$, 10% to 30% of $Al_2O_3$, 0% to 10% of $B_2O_3$, 2% to 11% of $Li_2O$, 5% to 25% of $Na_2O$, 0% to 10% of $K_2O$, 0% to 6% of MgO, and 0% to 20% of $P_2O_3$.

According to one embodiment of the present invention, which has been devised in order to solve the above-mentioned problem, there is provided a method of producing a tempered glass having a surface and a thickness T, the method comprising: a first ion exchange step of bringing a glass to be tempered containing $Li_2O$ and $Na_2O$ into contact with a first molten salt containing a Na ion to introduce the Na ion into the glass to be tempered; and a second ion exchange step of bringing, after the first ion exchange step, the glass to be tempered into contact with a second molten salt containing a Li ion and a K ion to desorb at least part of the Na ion from the glass to be tempered, and to introduce the K ion into the glass to be tempered, wherein the first ion exchange step and the second ion exchange step are performed so that a stress profile of the tempered glass obtained by measuring a stress in a depth direction from the surface with a compressive stress being represented by a positive number and a tensile stress being represented by a negative number has an inflection point at which a second derivative of the stress profile becomes zero between the surface and a depth equal to a half of the thickness T.

With such configuration, the tempered glass of the present invention having a complicated stress profile shape can be obtained through a small number of steps.

In the above-mentioned configuration, it is preferred that the inflection point be formed in the second ion exchange step.

Advantageous Effects of Invention

According to the present invention, the tempered glass having impact resistance higher than that of the related art is obtained by reducing the compressive stress value at the first inflection point to reduce the tensile stress value while maintaining a high compressive stress value at the surface.

DESCRIPTION OF EMBODIMENTS

A tempered glass according to an embodiment of the present invention is described below.
(Tempered Glass)

Figure 1:
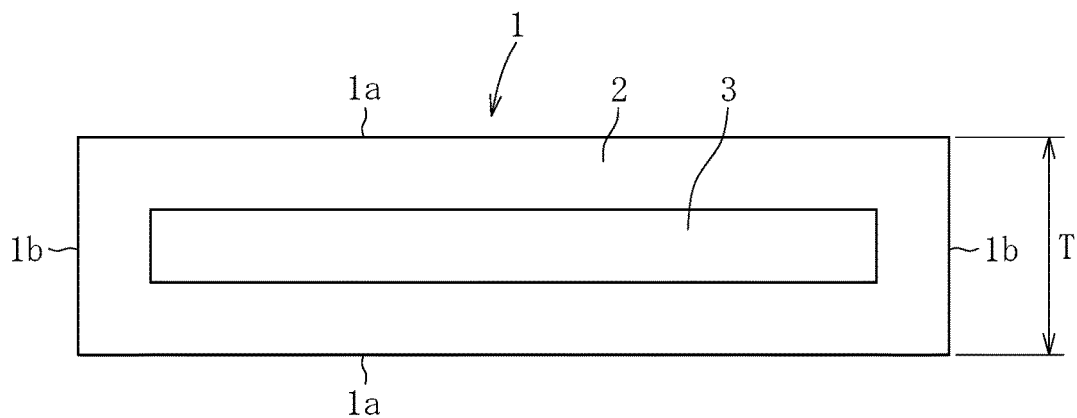
FIG. 1 is a schematic view for illustrating a cross-section of a tempered glass according to an embodiment of the present invention.

As illustrated in FIG. 1, a tempered glass 1 according to this embodiment is a chemically tempered glass subjected to chemical tempering by ion exchange and having a sheet shape, and comprises a compressive stress layer 2 and a tensile stress layer 3.

A thickness T of the tempered glass 1 is preferably 2.0 mm or less, 1.8 mm or less, 1.6 mm or less, 1.4 mm or less, 1.2 mm or less, 1.0 mm or less, 0.9 mm or less, 0.85 mm or less, or 0.8 mm or less. In addition, the thickness T of the tempered glass 1 is preferably 0.03 mm or more, 0.05 mm or more, 0.1 mm or more, 0.15 mm or more, 0.2 mm or more, 0.25 mm or more, 0.3 mm or more, 0.35 mm or more, 0.4 mm or more, 0.45 mm or more, 0.5 mm or more, 0.6 mm or more, or 0.65 mm or more. The thickness T of the tempered glass 1 is not limited thereto, and may be arbitrarily set.

The compressive stress layer 2 is formed in a surface layer portion, which comprises main surfaces 1a and end surfaces 1b, of the tempered glass 1. The tensile stress layer 3 is formed in an inner portion of the tempered glass 1, that is, at a position deeper than that of the compressive stress layer 2.

Figure 2:
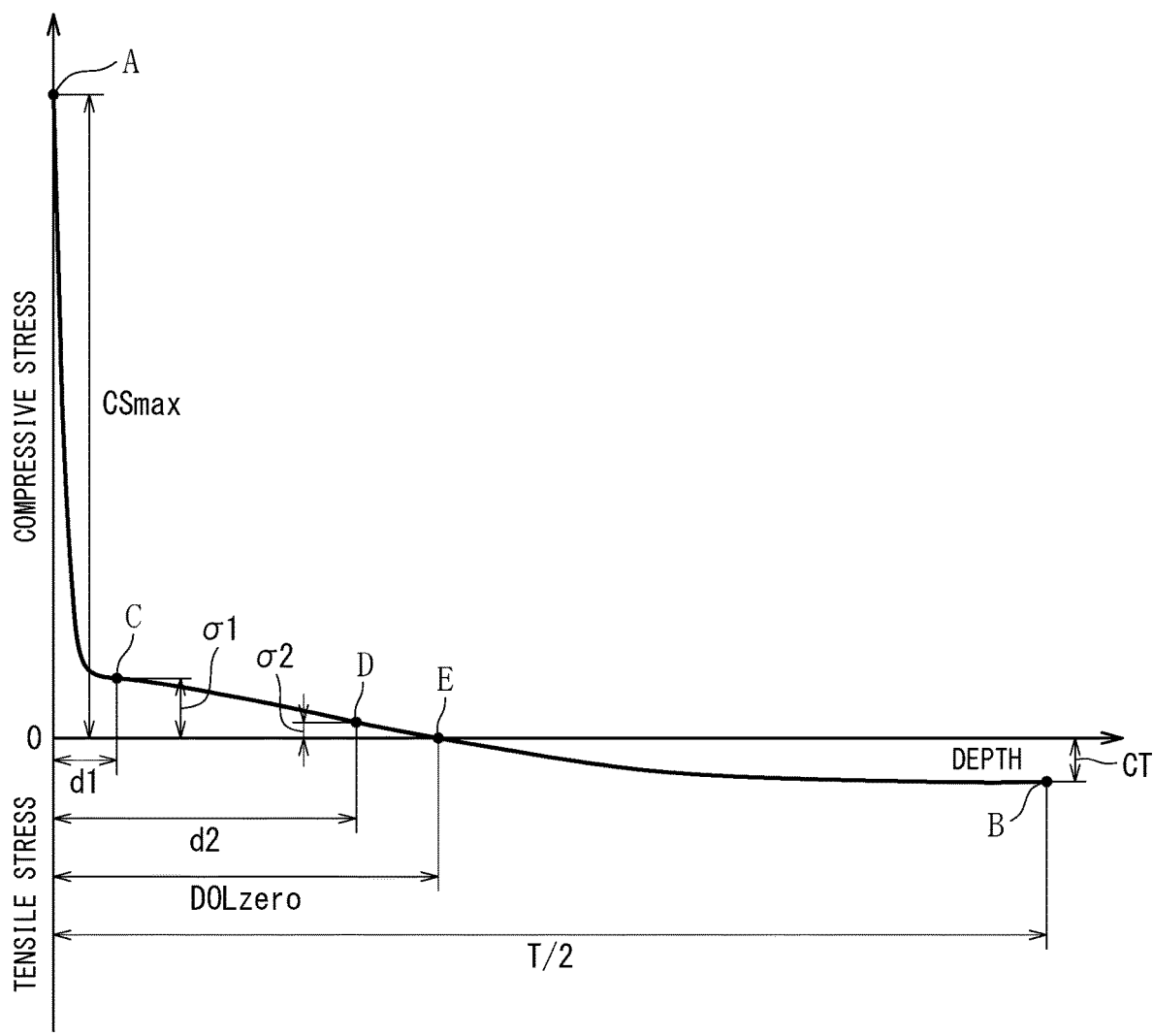
FIG. 2 is a graph for showing the outline of the stress profile of the tempered glass according to the embodiment of the present invention in its thickness direction.

The stress profile (stress distribution) of the tempered glass 1 is obtained by measuring a stress in a depth direction (direction orthogonal to the main surfaces 1a) from a main surface 1a side with a compressive stress being represented by a positive number and a tensile stress being represented by a negative number. The stress profile of the tempered glass 1 thus obtained is, for example, as shown in FIG. 2. In the graph of FIG. 2, an axis of ordinate indicates a stress and an axis of abscissa indicates a position (depth) in the thickness direction with respect to one of the main surfaces 1a. In the graph of FIG. 2, a stress of a positive value represents a compressive stress, and a stress of a negative value represents a tensile stress. That is, it is shown that, as the absolute value of a stress in the graph of FIG. 2 becomes larger, the stress becomes larger. FIG. 2 is a conceptual view, and the stress profile of the tempered glass 1 is not limited to this mode.

The stress profile of the tempered glass 1 has a maximum compressive stress CSmax at a point A corresponding to the main surface 1a. The maximum compressive stress CSmax is 400 MPa or more, preferably 450 MPa or more, 500 MPa or more, 550 MPa or more, from 600 MPa to 1,200 MPa, from 600 MPa to 1,150 MPa, from 600 MPa to 1,100 MPa, from 600 MPa to 1,050 MPa, from 600 MPa to 1,000 MPa, from 700 MPa to 950 MPa, from 700 MPa to 900 MPa, or from 750 MPa to 900 MPa.

The stress profile of the tempered glass 1 has an inflection point at which the second derivative of the stress profile becomes zero between the main surface 1a (point A) and a depth (point B) equal to a half of the thickness T. In this embodiment, the stress profile has a plurality of inflection points. Of the plurality of inflection points, an inflection point present at a position closest to the main surface 1a is referred to as first inflection point C, and an inflection point present at a position deeper than the first inflection point (i.e., an inflection point present at a position second closest to the main surface 1a after the first inflection point C) is referred to as second inflection point D.

A stress σ1 at the first inflection point C is a compressive stress. The stress σ1 at the first inflection point C is 150 MPa or less, preferably 140 MPa or less, 130 MPa or less, 120 MPa or less, 110 MPa or less, 100 MPa or less, 90 MPa or less, 80 MPa or less, 70 MPa or less, from 30 MPa to 80 MPa, or from 40 MPa to 75 MPa.

At the first inflection point C, the value of the second derivative of the stress profile changes from positive to negative.

A depth d1 of the first inflection point C from the main surface 1a is preferably 50 μm or less, 45 μm or less, 40 μm or less, 35 μm or less, 30 μm or less, or 25 μm or less.

A stress σ2 at the second inflection point D is preferably 45 MPa or less, 40 MPa or less, 35 MPa or less, 30 MPa or less, 25 MPa or less, 20 MPa or less, 15 MPa or less, or 10 MPa or less. The stress σ2 at the second inflection point D may be a negative value, that is, a tensile stress.

At the second inflection point D, the value of the second derivative of the stress profile changes from negative to positive.

The depth of the second inflection point D from the main surface 1a is preferably 60 μm or more, 70 μm or more, 80 μm or more, 90 μm or more, 95 μm or more, 100 μm or more, 110 μm or more, 120 μm or more, or 130 μm or more.

The following relationship is preferably established among the stress σ1 at the first inflection point C, the depth d1 of the first inflection point C, the stress σ2 at the second inflection point D, and a depth d2 of the second inflection point D. That is, (σ1−σ2)/(d1−d2) is preferably −1.0 MPa/μm or more. (σ1−σ2)/(d1−d2) is more preferably −0.9 MPa/μm or more, −0.8 MPa/μm or more, −0.7 MPa/μm or more, −0.6 MPa/μm or more, −0.5 MPa/μm or more, or −0.4 MPa/μm or more.

The stress profile of the tempered glass 1 has a zero stress point E at which the stress becomes zero. In general, it is difficult for a depth DOLzero of the zero stress point E from the main surface 1a to exceed 20% of the thickness T, and its physical limit is about 22%. However, in this embodiment, a DOLzero exceeding the limit value can be obtained. As the depth DOLzero of the zero stress point E increases, strength against penetration by a protruding object becomes higher. The depth DOLzero of the zero stress point E from the main surface 1a is preferably 12% or more, 12.5% or more, 13% or more, 13.5% or more, 14% or more, 14.5% or more, 15% or more, 15.5% or more, 16% or more, 16.5% or more, 17% or more, 17.5% or more, 18% or more, 18.5% or more, 19% or more, 19.5% or more, 20% or more, 20.5% or more, 21% or more, 21.5% or more, 22.0% or more, 22.5% or more, 23% or more, 23.5% or more, or 24% or more of the thickness T. However, when the depth DOLzero of the zero stress point E is excessively large, for example, an excessive tensile stress may be generated at the depth (point B) equal to a half of the thickness T from the main surface 1a. Thus, the depth DOLzero of the zero stress point E is preferably 35% or less, 34.5% or less, 34% or less, 33.5% or less, 33% or less, 32.5% or less, 32% or less, 31.5% or less, 31% or less, 30.5% or less, 30% or less, 29.5% or less, 29% or less, 28.5% or less, 28% or less, or 27% or less of the thickness T.

When the integrated value of the compressive stress from the main surface 1a (point A) to the zero stress point E is represented by $S_{CS}$ (MPa·mm), $S_{CS}$/TI is preferably 16.0 MPa or less. $S_{CS}$/T is more preferably 15.5 MPa or less, 15.0 MPa or less, 14.5 MPa or less, 14.0 MPa or less, 13.5 MPa or less, 13.0 MPa or less, 12.5 MPa or less, 12.0 MPa or less, 11.5 MPa or less, or 11.0 MPa or less.

The stress profile of the tempered glass 1 has a maximum tensile stress CT, at which the tensile stress shows its maximum absolute value, at the point B corresponding to the depth equal to a half of the thickness T from the main surface 1a. The absolute value of the maximum tensile stress CT is preferably 70 MPa or less, 65 MPa or less, 60 MPa or less, from 40 MPa to 55 MPa, from 45 MPa to 55 MPa, or from 50 MPa to 55 MPa.

Figure 3:
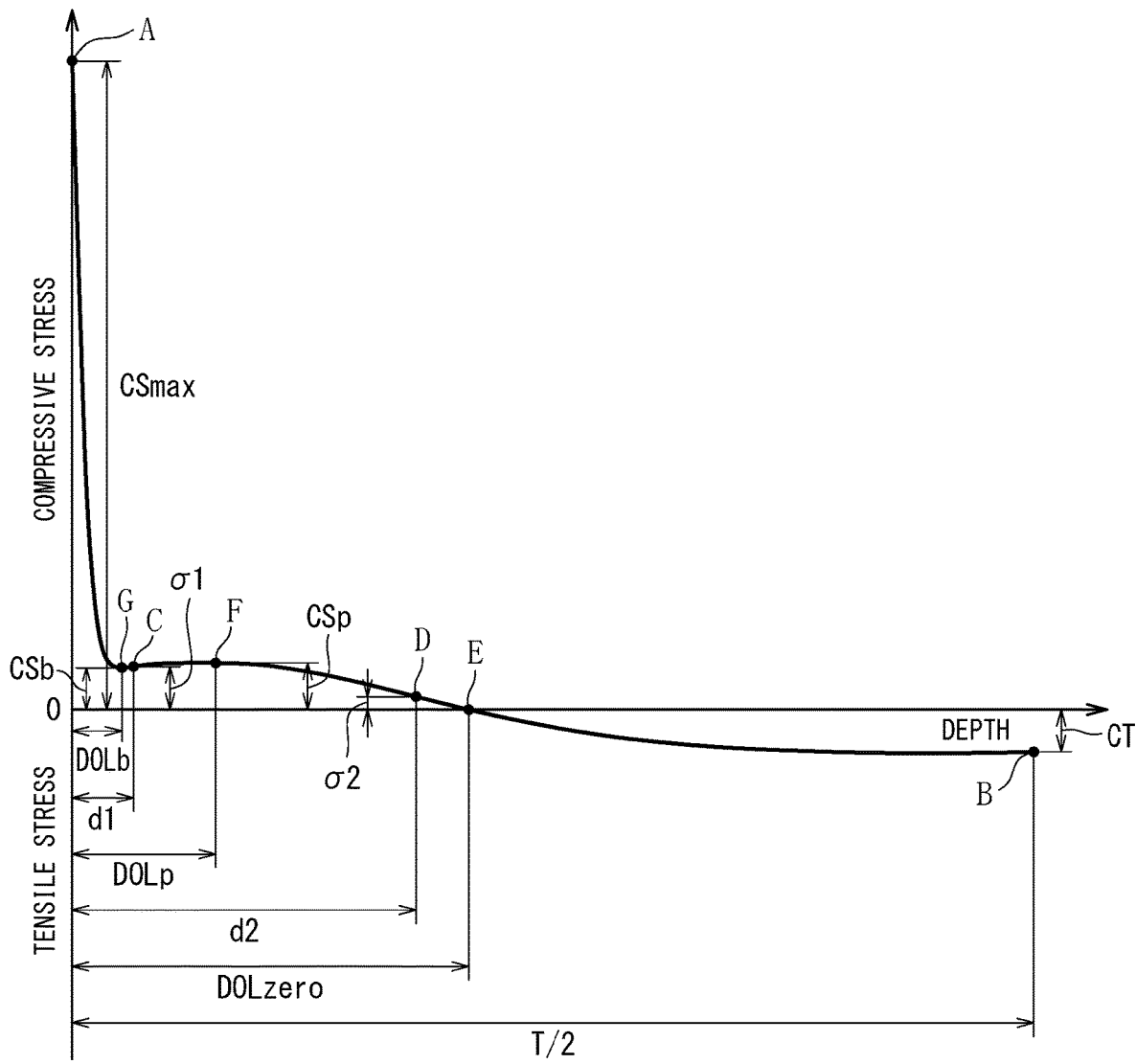
FIG. 3 is a graph for showing the outline of the stress profile of the tempered glass according to the embodiment of the present invention in its thickness direction.

As shown in FIG. 3, the stress profile of the tempered glass 1 may have a peak point F showing a local maximum value of the compressive stress between the first inflection point C and the second inflection point D. That is, the compressive stress gradually increases with an increase in depth in the depth direction between the first inflection point C and the peak point F, and the compressive stress gradually reduces with an increase in depth in the depth direction between the peak point F and the second inflection point D. As a result, a hump-shaped stress peak with the peak point F as a vertex is formed between the first inflection point C and the second inflection point D. A compressive stress CSp at the peak point F is preferably from 15 MPa to 250 MPa, from 15 MPa to 240 MPa, from 15 MPa to 230 MPa, from 15 MPa to 220 MPa, from 15 MPa to 210 MPa, from 15 MPa to 200 MPa, from 15 MPa to 190 MPa, from 15 MPa to 180 MPa, from 15 MPa to 175 MPa, from 15 MPa to 170 MPa, from 15 MPa to 165 MPa, or from 15 MPa to 160 MPa. A depth DOLp of the peak point F is preferably from 4% to 20%, from 4% to 19%, from 4% to 18.5%, from 4% to 18%, from 4% to 17.5%, from 4% to 17%, from 4.5% to 17%, from 5% to 17%, from 6% to 17%, from 7.3% to 17%, or from 8% to 15% of the thickness T.

When the stress profile has the peak point F showing a local maximum value of the compressive stress, the stress profile has, between the point A (main surface) and the peak point F, a bottom point G at which the stress, which gradually reduces from the point A in the depth direction, takes a local minimum value. In other words, in this case, the stress gradually increases from the bottom point G in the depth direction between the bottom point G and the peak point F, and the stress takes a local maximum value at the peak point F. A case in which a stress CSb at the bottom point G is a compressive stress (positive value) is shown as an example in FIG. 3, but the stress CSb may be a tensile stress (negative value). As the stress CSb at the bottom point G becomes lower, a tensile stress CT becomes lower to make behavior at the time of breakage slower. The stress CSb at the bottom point G is preferably +100 MPa or less, more preferably +90 MPa or less, +80 MPa or less, +70 MPa or less, or +60 MPa or less. However, when the stress CSb at the bottom point G is too low, a crack is generated in the surface during a tempering step to degrade visibility. The stress CSb at the bottom point G is preferably −50 MPa or more, more preferably −45 MPa or more, −40 MPa or more, −35 MPa or more, or −30 MPa or more. The stress CSb at the bottom point G may be 0 MPa or more and +65 MPa or less, or may be −30 MPa or more and less than 0 MPa. A depth DOLb of the bottom point G is preferably from 0.5% to 12% of the thickness T, more preferably from 1% to 7% of the thickness T.

In this embodiment, the tempered glass 1 has a similar stress profile in each of the end surfaces 1b as well. That is, when the compressive stress of the tempered glass 1 is represented by a positive number and the tensile stress thereof is represented by a negative number, the compressive stress at the end surface 1b is 400 MPa or more, a stress profile obtained by measuring a stress in a depth direction (direction orthogonal to the end surface 1b) from the end surface 1b has inflection points at each of which the second derivative of the stress profile becomes zero between the end surface 1b and a depth equal to a half of the thickness T, the compressive stress at a first inflection point present at a position closest to the end surface 1b among the inflection points is 150 MPa or less, and the compressive stress at a second inflection point present at a position deeper than the first inflection point is 45 MPa or less. The preferred ranges of the stress profile for each of the main surfaces 1a may be similarly applied to the preferred ranges of the stress profile for each of the end surfaces 1b.

Values obtained by measurement and synthesis with, for example, FSM-6000LE and SLP-1000 manufactured by Orihara Manufacturing Co., Ltd. may be used as the stress of the tempered glass 1 and its distribution.

(Method of Producing Tempered Glass)

The tempered glass 1 configured as described above may be produced by, for example, the following procedure. That is, a method of producing the tempered glass 1 comprises: a preparation step of preparing a sheet-shaped glass that contains an alkali metal oxide as a composition and is to be subjected to tempering treatment (hereinafter referred to as glass to be tempered); and an ion exchange step of subjecting the glass to be tempered to ion exchange treatment.

The glass to be tempered that is prepared in the preparation step is preferably a lithium aluminosilicate glass comprising, in terms of mass %, 2% or more of $Li_2O$ and 5% or more of $Na_2O$.

Specifically, it is preferred that the glass to be tempered comprise, for example, as a glass composition, in terms of mass %, 40% to 70% of $SiO_2$, 10% to 30% of $Al_2O_3$, 0% to 10% of $B_2O_3$, 2% to 11% of $Li_2O$, 5% to 25% of $Na_2O$, 0% to 10% of $K_2O$, 0% to 6% of MgO, and 0% to 20% of $P_2O_3$.

Described below are reasons why the composition as described above is preferred. In the description of the content range of each component, the expression "%" means "mass %" unless otherwise specified.

$SiO_2$ is a component that forms a glass network. When the content of $SiO_2$ is too small, vitrification does not occur easily, and acid resistance is liable to lower. Thus, a suitable lower limit range of the content of $SiO_2$ is 40% or more, 42% or more, 44% or more, 46% or more, 48% or more, 49% or more, 50% or more, or 51% or more. Meanwhile, when the content of $SiO_2$ is too large, meltability and formability are liable to lower, and a thermal expansion coefficient becomes too low, with the result that it becomes difficult to match the thermal expansion coefficient with those of peripheral materials. Thus, a suitable upper limit range of the content of $SiO_2$ is 70% or less, 68% or less, 65% or less, 62% or less, 60% or less, 58% or less, 57% or less, or 56% or less.

$Al_2O_3$ is a component that increases an ion exchange rate, and is also a component that increases a Young's modulus to increase a Vickers hardness. Further, $Al_2O_3$ is a component that increases a viscosity at which phase separation occurs. When the content of $Al_2O_3$ is too small, the ion exchange rate and the Young's modulus are liable to lower. Thus, a suitable lower limit range of the content of $Al_2O_3$ is 10% or more, 11% or more, 12% or more, 13% or more, 14% or more, 14.5% or more, 15% or more, 15.5% or more, 16% or more, 16.5% or more, 17% or more, 17.5% or more, 18% or more, 18.5% or more, 19% or more, 21% or more, 22% or more, 23% or more, or 24% or more. Meanwhile, when the content of $Al_2O_3$ is too large, devitrified crystals are liable to be deposited in the glass, and it becomes difficult to form a sheet shape by an overflow down-draw method or the like. In particular, when the sheet shape is formed by the overflow down-draw method through use of an alumina refractory as a forming body refractory, a devitrified crystal of spinel is liable to be deposited at an interface between the glass and the alumina refractory. In addition, the acid resistance reduces and hence it becomes difficult to apply the glass to an acid treatment step. In addition, viscosity at high temperature increases, which is liable to lower the meltability. Thus, a suitable upper limit range of the content of $Al_2O_3$ is 30% or less, 29% or less, or 28% or less.

$B_2O_3$ is a component that lowers the viscosity at high temperature and a density, and increases devitrification resistance. However, when the content of $B_2O_3$ is too large, the ion exchange rate (in particular, depth of layer) is liable to lower. In addition, coloring on the surface of the glass called weathering may occur through ion exchange, and acid resistance and water resistance are liable to lower. Thus, a suitable range of the content of $B_2O_3$ is from 0% to 10%, from 0% to 5%, or from 0% to 1%.

$Li_2O$ is an ion exchange component, and is also a component that lowers the viscosity at high temperature to increase the meltability and the formability. Further, $Li_2O$ is a component that increases the Young's modulus. A suitable lower limit range of the content of $Li_2O$ is 2% or more, 2.5% or more, or 2.8% or more, and a suitable upper limit range of the content of $Li_2O$ is 11% or less, 10% or less, 5% or less, or 4.5% or less.

$Na_2O$ is an ion exchange component, and is also a component that lowers the viscosity at high temperature to increase the meltability and the formability. In addition, $Na_2O$ is also a component that improves the devitrification resistance, including resistance to devitrification through a reaction with a forming body refractory, in particular, an alumina refractory. When the content of $Na_2O$ is too small, the meltability lowers, the thermal expansion coefficient lowers excessively, and the ion exchange rate is liable to lower. Thus, a suitable lower limit range of the content of $Na_2O$ is 5% or more, 6% or more, or 7% or more. Meanwhile, when the content of $Na_2O$ is too large, the viscosity at which phase separation occurs is liable to lower. In addition, the acid resistance lowers, and the glass composition loses its component balance, with the result that the devitrification resistance lowers contrarily in some cases. Thus, a suitable upper limit range of the content of $Na_2O$ is 22% or less, 20% or less, 19.5% or less, 19% or less, 18% or less, 17% or less, 16.5% or less, 16% or less, or 15.5% or less, particularly 15% or less.

$K_2O$ is a component that lowers the viscosity at high temperature to increase the meltability and the formability. Further, $K_2O$ is also a component that improves the devitrification resistance, and increases the Vickers hardness. However, when the content of $K_2O$ is too large, the viscosity at which phase separation occurs is liable to lower. In addition, there is a tendency that the acid resistance lowers, and the glass composition loses its component balance, with the result that the devitrification resistance lowers contrarily. Thus, a suitable lower limit range of the content of $K_2O$ is 0% or more, 0.01% or more, 0.02% or more, 0.1% or more, or 0.5% or more, and a suitable upper limit range thereof is 10% or less, 5.5% or less, 5% or less, or less than 4.5%.

MgO is a component that lowers the viscosity at high temperature to increase the meltability and the formability. In addition, MgO is also a component that increases the Young's modulus to increase the Vickers hardness, and increases the acid resistance. Thus, a suitable lower limit range of the content of MgO is 0% or more, 0.1% or more, 0.5% or more, 1% or more, 1.5% or more, or 2% or more. However, when the content of MgO is too large, there is a tendency that the ion exchange rate is liable to lower, and the glass is liable to devitrify. In particular, when a sheet shape is formed by an overflow down-draw method through use of an alumina refractory as a forming body refractory, a devitrified crystal of spinel is liable to be deposited at an interface between the glass and the alumina refractory. Thus, a suitable upper limit range of the content of MgO is 6% or less, 5.5% or less, 4.5% or less, 4% or less, 3.5% or less, 3% or less, or 2.5% or less.

$P_2O_5$ is a component that increases the ion exchange rate while maintaining a compressive stress value. Thus, a suitable lower limit range of the content of $P_2O_5$ is 0% or more, 2% or more, 2.1% or more, 2.5% or more, 3% or more, 4% or more, or 4.5% or more. However, when the content of $P_2O_5$ is too large, white turbidity resulting from phase separation occurs in the glass, and the water resistance is liable to lower. Thus, a suitable upper limit range of the content of $P_2O_5$ is 20% or less, 10% or less, or 8.5% or less.

In addition to the above-mentioned components, for example, the following components may be added.

ZnO is a component that increases the ion exchange rate and is a component that has a great effect of increasing the compressive stress value, in particular. In addition, ZnO is a component that lowers the viscosity at high temperature without lowering viscosity at low temperature. However, when the content of ZnO is too large, there is a tendency that the glass undergoes phase separation, the devitrification resistance lowers, the density increases, and the depth of layer decreases. Thus, a suitable content of ZnO is from 0% to 10%, or from 0% to 3%, particularly from 0% to 7%, from 0% to 5%, from 0% to 3%, or from 0% to 1%.

$SnO_2$ has an effect of enhancing the ion exchange performance. Thus, the content of $SnO_2$ is preferably from 0% to 3%, from 0.01% to 3%, from 0.05% to 3%, or from 0.1% to 3%, particularly preferably from 0.2% to 3%.

As a fining agent, one kind or two or more kinds selected from the group consisting of Cl, $SO_3$, and $CeO_2$ (preferably the group consisting of Cl and $SO_3$) may be added at from 0% to 3%.

The content of $Fe_2O_3$ is preferably less than 1,000 ppm (less than 0.1% ), less than 800 ppm, less than 600 ppm, or less than 400 ppm, particularly preferably less than 300 ppm. With this configuration, the transmittance (400 nm to 770 nm) of glass having a thickness of 1 mm is easily improved.

A rare earth oxide, such as $Nb_2O_5$ or $La_2O_3$, is a component that enhances the Young's modulus. However, the cost of the raw material itself is high, and when the rare earth oxide is added in a large amount, the devitrification resistance is liable to lower. Thus, the content of the rare earth oxide is preferably 3% or less, 2% or less, 1% or less, or 0.5% or less, particularly preferably 0.1% or less.

In addition, it is preferred that the glass to be tempered be substantially free of $As_2O_3$, $Sb_2O_3$, and PbO as a glass composition from the standpoint of environmental considerations. In addition, it is also preferred that the glass to be tempered be substantially free of $Bi_2O_3$ and F from the standpoint of environmental considerations.

The composition of the glass to be tempered described above is an example, and a glass to be tempered having a known composition may be used as long as the glass can be chemically tempered by ion exchange. In addition, the composition of the tempered glass to be obtained by subjecting the above-mentioned glass to be tempered to ion exchange treatment is similar to the composition of the glass to be tempered before the ion exchange treatment.

The glass to be tempered may be produced as described below.

First, glass raw materials, which have been blended so as to have the above-mentioned glass composition, are loaded in a continuous melting furnace, are melted by heating at from 1,500° C. to 1,600° C., and are fined. After that, the resultant is fed to a forming apparatus, is formed into, for example, a sheet shape, and is annealed. Thus, the glass to be tempered can be produced.

An overflow down-draw method is preferably adopted as a method of forming the glass sheet. The overflow down-draw method is a method by which a high-quality glass sheet can be produced in a large amount, and by which even a large-size glass sheet can be easily produced. In addition, the method allows scratches on the surface of the glass sheet to be reduced to the extent possible. In the overflow down-draw method, alumina or dense zircon is used as a forming body. The glass to be tempered according to the present invention has satisfactory compatibility with alumina or dense zircon, in particular, alumina (hardly produces bubbles, stones, and the like through a reaction with the forming body).

Various forming methods other than the overflow down-draw method may also be adopted. For example, forming methods such as a float method, a down draw method (such as a slot down method or a re-draw method), a roll out method, and a press method may be adopted.

Bending processing may be performed as required after the forming of the glass to be tempered, or simultaneously with the forming. In addition, processing such as cutting processing, boring processing, surface polishing processing, chamfering processing, end surface polishing processing, or etching processing may be performed as required.

The dimensions of the glass to be tempered may be arbitrarily set, but the thickness T is preferably 2.0 mm or less, more preferably 1.0 mm or less, still more preferably from 0.3 mm to 0.9 mm.

Figure 4:
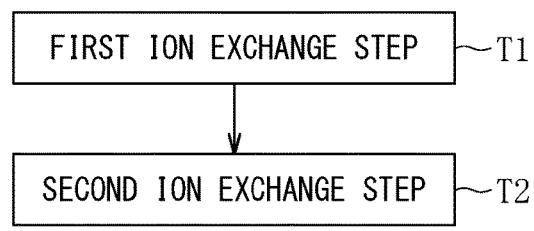
FIG. 4 is a flowchart of a method of producing the tempered glass according to the embodiment of the present invention.

As illustrated in FIG. 4, in this embodiment, a case in which the ion exchange step comprises a first ion exchange step (first tempering step) T1 of bringing a surface of the glass to be tempered into contact with a first molten salt (first metal salt) and a second ion exchange step (second tempering step) T2 of bringing the surface of the glass to be tempered into contact with a second molten salt (second metal salt) is given as an example. In each of the ion exchange steps, the glass to be tempered is preferably immersed in the molten salt.

In the first ion exchange step T1, the ion exchange treatment of the surface of the glass to be tempered is performed by: immersing the glass to be tempered in a treatment tank filled with a first molten salt containing a Na ion having a larger ionic radius than a Li ion contained in the glass to be tempered; and holding the glass to be tempered at a predetermined temperature for a predetermined time. Thus, the Li ion contained in the glass to be tempered and the Na ion contained in the first molten salt are subjected to ion exchange to introduce the Na ion in the vicinity of the surface (in this embodiment, main surfaces and end surfaces) of the glass to be tempered. As a result, a compressive stress layer is formed in a surface layer portion of the glass to be tempered, and thus the glass to be tempered is tempered.

In the first ion exchange step T1, the Li ion is a desorbed ion to be desorbed from the glass to be tempered, and the Na ion is an introduced ion to be introduced into the glass to be tempered.

In the first ion exchange step T1, a region in which the Na ion is introduced into the glass to be tempered is preferably a region ranging from the surface of the glass to be tempered to a depth of 10% or more of the thickness T, more preferably a region ranging from the surface of the glass to be tempered to a depth of 12% or more, 14% or more, 15% or more, or 15% or more and 40% or less of the thickness T.

In the second ion exchange step T2, the ion exchange treatment of the surface of the glass to be tempered is performed by: immersing the glass to be tempered in a treatment tank filled with a second molten salt containing a K ion, which has a larger ionic radius than the Na ion contained in the glass to be tempered, and the Li ion; and holding the glass to be tempered at a predetermined temperature for a predetermined time. Thus, the Li ion is subjected to reverse ion exchange with the Na ion contained in the glass to be tempered, to desorb at least part of the Na ion from the glass to be tempered. Simultaneously with this, the K ion is subjected to ion exchange with the Li ion or the Na ion contained in the glass to be tempered, to introduce the K ion into the tempered glass to a region ranging from the surface and being shallower than 7% of the thickness T. That is, while the compressive stress formed in the surface layer portion of the glass to be tempered is relaxed through the reverse ion exchange, the glass to be tempered is tempered through the ion exchange, with the result that a high compressive stress is formed only in the vicinity of the surface in the surface layer portion.

In this connection, in the second ion exchange step T2, the rate of the reverse ion exchange is larger than the rate of the ion exchange, and hence the relaxation of the compressive stress in the surface layer portion first progresses to a deep site, and then a compressive stress is formed in the surface again.

In the second ion exchange step T2, a region in which the Na ion is desorbed from the glass to be tempered is preferably a region ranging from the surface of the glass to be tempered to a depth of 15% or less of the thickness T, more preferably a region ranging from the surface of the glass to be tempered to a depth of 14% or less, 13% or less, 12% or less, 11% or less, 10% or less, 1% or more and 10% or less, 2% or more and 10% or less, 3% or more and 10% or less, 4% or more and 10% or less, or 5% or more and 10% or less of the thickness T. In addition, in the second ion exchange step T2, a region in which the K ion is introduced into the glass to be tempered is preferably a region ranging from the surface of the glass to be tempered to a depth of 7% or less of the thickness T, more preferably a region ranging from the surface of the glass to be tempered to a depth of 6.5% or less, 6% or less, 5.5% or less, or 5% or less of the thickness T.

The tempered glass 1 having the above-mentioned characteristics can be obtained by appropriately adjusting the treatment times and the treatment temperatures in the condition ranges of the first ion exchange step T1 and the second ion exchange step T2 described above.

In this connection, in the first ion exchange step T1, no inflection point at which the second derivative of the stress profile becomes zero is formed in the stress profile of the glass to be tempered. That is, the first inflection point C and the second inflection point D at each of which the second derivative of the stress profile becomes zero are not formed in the stress profile of the glass to be tempered (tempered glass 1) until the second ion exchange step T2.

When a molten salt formed only of $NaNO_3$ or a mixed salt containing $NaNO_3$ and $KNO_3$ as main components may be used as the first molten salt. The first molten salt may contain $LiNO_3$. In this case, the $Li_2O$ content of the glass to be tempered is preferably from 2.5 mass % to 5.0 mass %, more preferably from 2.8 mass % to 4.5 mass %.

The first molten salt to be used in the first ion exchange step T1 is preferably a mixed salt of $NaNO_3$ and $KNO_3$. The first molten salt containing a K ion is suitable for the control of the quality of the tempered glass to be obtained because it becomes easy to measure the stress of the glass to be tempered and the distribution thereof after the first ion exchange step T1. A $NaNO_3$ concentration in the first molten salt is, in terms of mass %, preferably from 100% to 20%, from 100% to 30%, from 100% to 40%, from 100% to 50%, or from 100% to 60%, and the balance is preferably $KNO_3$. The $NaNO_3$ concentration in the first molten salt is preferably higher than a $KNO_3$ concentration in the first molten salt. The first molten salt may be configured to contain only $NaNO_3$, and not to contain $KNO_3$. An ion exchange treatment temperature in the first ion exchange step T1 is preferably from 350° C. to 480° C., more preferably from 360° C. to 430° C., still more preferably from 370° C. to 400° C., or from 370° C. to 390° C. An ion exchange treatment time in the first ion exchange step T1 is preferably from 1 hour to 20 hours, more preferably from 1.5 hours to 15 hours, still more preferably from 2 hours to 10 hours.

The second molten salt to be used in the second ion exchange step T2 is preferably a mixed salt of $LiNO_3$ and $KNO_3$. A $LiNO_3$ concentration in the second molten salt is preferably lower than a $KNO_3$ concentration in the second molten salt. Specifically, the $LiNO_3$ concentration in the second molten salt is, in terms of mass %, preferably from 0.1% to 5%, from 0.2% to 5%, from 0.3% to 5%, from 0.4% to 5%, from 0.5% to 5%, from 0.5% to 4%, from 0.5% to 3%, from 0.5% to 2.5%, from 0.5% to 2%, or from 1% to 2%, and the balance is preferably $KNO_3$. In addition, a Li ion concentration in the second molten salt is preferably 100 ppm by mass % or more. In this case, the Li ion concentration in the second molten salt is determined by multiplying $LiNO_3$ expressed in mass % by 0.101. An ion exchange treatment temperature in the second ion exchange step T2 is preferably from 350° C. to 480° C., more preferably from 360° C. to 430° C., still more preferably from 370° C. to 400° C., or from 370° C. to 390° C. An ion exchange treatment time in the second ion exchange step T2 is preferably shorter than the ion exchange treatment time in the first ion exchange step T1. The ion exchange treatment time in the second ion exchange step T2 is preferably 0.2 hour or more, more preferably from 0.3 hour to 2 hours, or from 0.4 hour to 1.5 hours, still more preferably from 0.5 hour to 1 hour.

After the second ion exchange step T2, various kinds of processing, such as cutting processing, boring processing, surface polishing processing, chamfering processing, end surface polishing processing, etching processing, and film formation processing, may each be performed.

Some embodiments of the present invention have been described above. Of course, however, the present invention is not limited to those embodiments, and various other embodiments are possible within the scope of the present invention.

In the embodiments described above, an example in which the tempered glass 1 comprises the compressive stress layer 2 on each of both front and back main surface 1a sides and the end surface 1b sides has been described. However, the tempered glass 1 may comprise the compressive stress layer 2 only in part of the surface layer portion thereof, and for example, may comprise the compressive stress layer 2 only on one main surface 1a side. As a method of forming the compressive stress layer 2 only in part of the surface layer portion of the tempered glass 1, there is given, for example, a method comprising: forming in advance a suppressive film (e.g., a $SiO_2$ film), which is configured to suppress the permeation of an introduced ion in ion exchange treatment, in a region of the glass to be tempered in which the compressive stress layer is not to be formed; and locally performing ion exchange treatment on part of the glass to be tempered free of the suppressive film.

In the above-mentioned embodiment, a method of producing the tempered glass 1 by subjecting the glass to be tempered to two ion exchange steps has been given as an example. However, the method of producing the tempered glass 1 is not limited thereto. For example, the glass to be tempered may be subjected to three or more ion exchange steps, or the glass to be tempered may be subjected to a heat treatment step in addition to two ion exchange steps. In the latter case, the heat treatment step is preferably performed between the first ion exchange step and the second ion exchange step in order to relax the compressive stress of the glass to be tempered.

In each of the above-mentioned embodiments, the tempered glass 1 has a flat sheet shape. However, the concept of sheet shape in the present invention also encompasses the form of a curved sheet shape having a curved surface.

EXAMPLES

The tempered glass according to the present invention is hereinafter described based on Examples. The following Examples are merely illustrative. The present invention is by no means limited to these Examples.

Samples were produced as described below. First, glasses to be tempered each having a composition shown in Table 1 as a glass composition were prepared.

TABLE 1

|  | wt % |
| --- | --- |
| $SiO_2$ | 51.5 |
| $Al_2O_3$ | 27.9 |
| $B_2O_3$ | 0.3 |
| $Li_2O$ | 3.3 |
| $Na_2O$ | 7.5 |
| $K_2O$ | 0.6 |
| MgO | 0.3 |
| $P_2O_5$ | 8.4 |
| $SnO_2$ | 0.1 |

Glass raw materials were blended so as to achieve the composition of Table 1, and were melted with a platinum pot at 1,600° C. for 21 hours. After that, the resultant molten glasses were subjected to flow-down forming from a refractory forming body by using an overflow down-draw method to be formed into sheet shapes having a thickness of 0.7 mm.

Next, the glasses to be tempered were each subjected to a total of two ion exchange treatments, that is, a first ion exchange step (tempering step) and a second ion exchange step (tempering step) by being immersed in molten salt baths under conditions shown in Table 2 to provide sheet-shaped tempered glasses. Samples Nos. 1 to 7 are Examples of the present invention, and Sample No. 8 is Comparative Example.

Various characteristics and strength test results of the tempered glasses thus obtained, which were measured as described below, are shown in Table 2.

TABLE 2

| | No. | | 1 | 2 | 3 | 4 | 5 | 6 | 7 | 8 |
| --- | --- | --- | --- | --- | --- | --- | --- | --- | --- | --- |
| | Thickness T | μm | 700 | 700 | 700 | 700 | 700 | 700 | 700 | 700 |
| First ion exchange step | $KNO_3$/$NaNO_3$/$LiNO_3$ | mass % | 25/75/0 | 25/75/0 | 25/75/0 | 40/60/0 | 40/60/0 | 40/60/0 | 25/74/1 | 40/60/0 |
| | Treatment temperature | ° C. | 410 | 410 | 410 | 380 | 380 | 380 | 380 | 380 |
| | Treatment time | h | 3 | 3 | 3 | 3 | 3 | 3 | 3 | 3 |
| Second ion exchange step | $KNO_3$/$NaNO_3$/$LiNO_3$ | mass % | 99.5/0/0.5 | 99/0/1 | 98.5/0/1.5 | 99.5/0/0.5 | 99/0/1 | 98.5/0/1.5 | 99/0/1 | 100/0/0 |
| | Treatment temperature | ° C. | 380 | 380 | 380 | 380 | 380 | 380 | 380 | 380 |
| | Treatment time | h | 0.75 | 0.75 | 0.75 | 0.75 | 0.75 | 0.75 | 0.75 | 0.75 |
| | CSmax | MPa | 819 | 705 | 661 | 834 | 757 | 708 | 727 | 1,085 |
| | DOLzero | μm | 137 | 145 | 146 | 134 | 144 | 143 | 148 | 124 |
| | DOLzero/T | % | 19.6 | 20.7 | 20.8 | 19.2 | 20.6 | 20.4 | 21.2 | 17.7 |
| | CT | MPa | 62 | 52 | 47 | 59 | 56 | 50 | 53 | 72 |
| | CSp | MPa | — | 46 | 40 | — | — | 55 | — | — |
| | DOLp | μm | — | 58 | 72 | — | — | 44 | — | — |
| | DOLp/T | % | — | 8 | 10 | — | — | 6 | — | — |
| | CSb | MPa | — | 37 | 13 | — | — | 45 | — | — |
| | DOLb | μm | — | 13 | 16 | — | — | 13 | — | — |
| | DOLb/T | % | — | 2 | 2 | — | — | 2 | — | — |
| | Scs (compressive stress integral) | MPa · mm | 9.8 | 8.2 | 7.3 | 9.4 | 8.5 | 8.0 | 7.3 | 11.6 |
| | Scs/T | MPa | 14.0 | 11.8 | 10.5 | 13.5 | 12.1 | 11.5 | 10.5 | 16.6 |
| First inflection point | d1 | μm | 25.1 | 20.9 | 18.7 | 22.4 | 18.1 | 22.4 | 21.2 | No inflection point |
| | σ2 | MPa | 73 | 51 | 51 | 78 | 70 | 47 | 52 | No inflection point |

TABLE 2-continued

| | No. | | 1 | 2 | 3 | 4 | 5 | 6 | 7 | 8 |
|---|---|---|---|---|---|---|---|---|---|---|
| Second inflection point | d2 | μm | 117.2 | 126.7 | 127.6 | 106.5 | 123.4 | 124.8 | 138.4 | No inflection point |
| | σ2 | MPa | 15 | 8 | 7 | 24 | 11 | 10 | −1 | No inflection point |
| (σ1 − σ2)/(d1 − d2) | | MPa/μm | −0.62 | −0.41 | −0.40 | −0.65 | −0.56 | −0.36 | −0.45 | No inflection point |
| Simulated casing drop strength | P180 | cm | 179 | 188 | 177 | 178 | 167 | 182 | 163 | 161 |
| | P120 | cm | 131 | 123 | 158 | 135 | 165 | 132 | 166 | 74 |
| | P100 | cm | 28 | 26 | 33 | 33 | 41 | 38 | 37 | 27 |

First, the stress profile of each of the samples was measured with a surface stress meter FSM-6000LE and SLP-1000 manufactured by Orihara Industrial Co., Ltd. Measurement results were synthesized using a data synthesis function preloaded on the above-mentioned apparatus to yield a retardation profile. The coverage of each set of data in the synthesis was set as follows: from the surface to 10 μm for FSM-6000LE; and 30 μm or more from the surface for SLP-1000. A stress profile was determined from the yielded retardation profile through such analysis as described below. First, initial values were set as shown in the following table, and the following expression R(x) at each depth x in the yielded retardation profile was calculated. In this case, the following setting was adopted: Δ=0.01 [um]. The sum of squared differences between the R(x) and the yielded retardation profile was calculated, and various variables A1, A2, A3, B1, B2, B3, and C1 were set so that the sum of squared differences became minimum. More specifically, with use of "GRG Nonlinear" as a solving method in the Solver function of Excel, approximation was performed by applying ranges and restriction conditions to the various variables in accordance with the following table. The approximation calculation was repeated until a correlation coefficient between the R(x) and the retardation profile exceeded 0.9995. When the correlation coefficient did not reach 0.9995, measurement was performed a plurality of times, and the analysis was performed using averaged measurement data from the plurality of times of measurement. The following expression σ(x) expressed using the various variables obtained as described above was adopted as the stress profile. An optical elastic constant C [nm/cm/MPa] was measured by using an optical heterodyne interference method, more specifically, by using PEL-3A-XR manufactured by Uniopt Co., Ltd. An apparatus constant k is a constant calculated in SLP-1000 by inputting the refractive index into the apparatus, more specifically, a value obtained by dividing a kDP value described in a measurement result file by a stress calibration coefficient. The refractive index was measured by using a V-block method, more specifically, by using KPR-2000 manufactured by Shimadzu Corporation.

$$\sigma(x) = A1 \cdot \mathrm{erfc}(B1 \cdot x) + A2 \cdot \mathrm{erfc}(B2 \cdot x) + A3 \cdot \mathrm{erfc}(B3 \cdot x) + C1$$

$$R(x) = R_0 + k \cdot C \cdot \frac{360}{\lambda} \cdot \int_0^x \sigma(t)dt =$$

$$\begin{cases} R_0 & (x=0) \\ R_0 + k \cdot C \cdot \frac{360}{\lambda} \cdot \sum_{k=1}^{\frac{x}{\Delta}} \left[ \frac{\sigma(\Delta \cdot k) + \sigma(\Delta \cdot (k+1))}{2} \cdot \Delta \right] & (x>0) \end{cases}$$

$k$ : apparatus constant, $C$ : optical elastic constant,
$\lambda$ : measurement wavelength (640 nm)

TABLE 3

| Variable | Range/condition | Initial value |
|---|---|---|
| A1 | 0 to 2,000 | 500 |
| A2 | −2,000 to 0 | −200 |
| A3 | 0 to 2,000 | 200 |
| B1 | 0.001 to 1 | 0.2 |
| B2 | 0.001 to 1 | 0.01 |
| B3 | 0.001 to 1 | 0.01 |
| C1 | −200 to 0 | −50 |
| R0 | Value at depth of 0 μm in retardation profile | |
| A1 + A2 + A3 + C | CS value measured with FSM-6000LE | |

Figure 5:
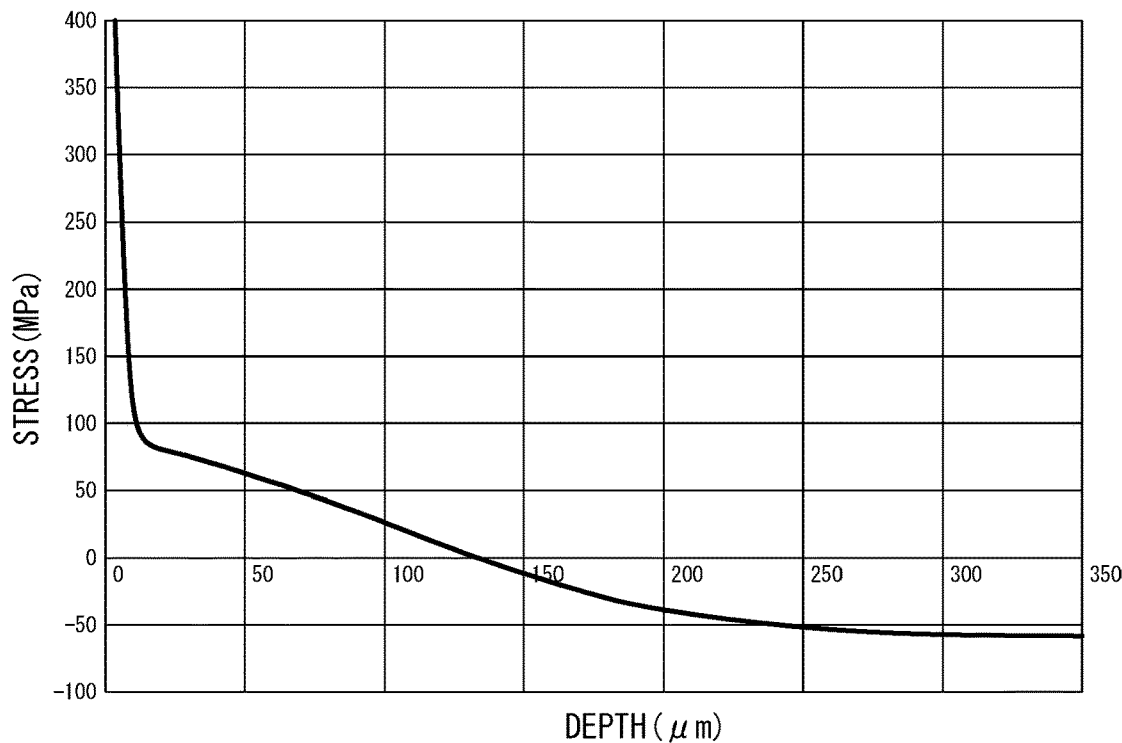
FIG. 5 is a graph for showing the stress profile of a tempered glass according to Sample No. 4.
Figure 6:
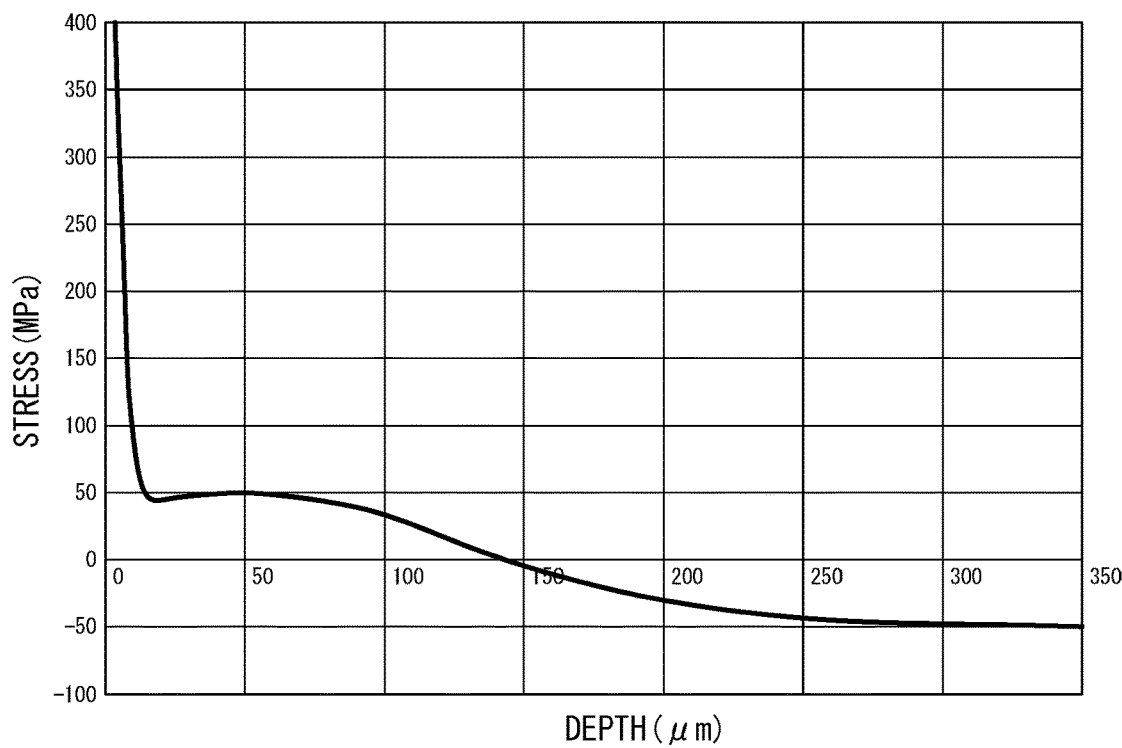
FIG. 6 is a graph for showing the stress profile of a tempered glass according to Sample No. 6.

Examples from the measured stress profiles are shown in FIG. 5 and FIG. 6. FIG. 5 is a graph for showing the stress profile of the tempered glass of Sample No. 4 in its thickness direction, and FIG. 6 is a graph for showing the stress profile of the tempered glass of Sample No. 6 in its thickness direction. In each of FIG. 5 and FIG. 6, an axis of abscissa indicates a depth (μm) from one main surface, and an axis of ordinate indicates the magnitude of a stress (MPa). In each of FIG. 5 and FIG. 6, a compressive stress is represented by a positive value, and a tensile stress is represented by a negative value.

Characteristics shown in Table 2 were calculated on the basis of the stress profiles measured as described above. Inflection points were each defined as a point at which the second derivative of the σ(x) became 0, and the points were designated as the first inflection point and the second inflection point in order of closeness to the surface. However, the surface x=0, which is a discontinuous point, is not regarded as an inflection point. Samples Nos. 2, 3, and 6 according to Examples each have the local maximum value CSp (hump-shaped stress peak) of the compressive stress between the first inflection point and the second inflection point, and the other samples according to Examples do not have any local maximum value of the compressive stress between the first inflection point and the second inflection point. Sample No. 8 serving as Comparative Example does not even have an inflection point.

In Table 2, CSmax represents the maximum value of the compressive stress in a compressive stress layer. DOLzero represents the depth of the zero stress point E from the main surface. CT represents the maximum absolute value of the tensile stress in a tensile stress layer. CSp represents the stress (local maximum value) at the peak point F formed between the first inflection point C and the second inflection point D, and DOLp represents the depth of the peak point F from the main surface. CSb represents the stress (local minimum value) at the bottom point G formed between the main surface and the peak point F, and DOLb represents the depth of the bottom point G from the main surface. $S_{CS}$ represents the integrated value of the compressive stress from the main surface to the zero stress point E. d1 represents the depth of the first inflection point C from the main surface. σ1 represents the stress at the first inflection point C. d2 represents the depth of the second inflection point D from the main surface. σ2 represents the stress at the second inflection point D.

Figure 7:
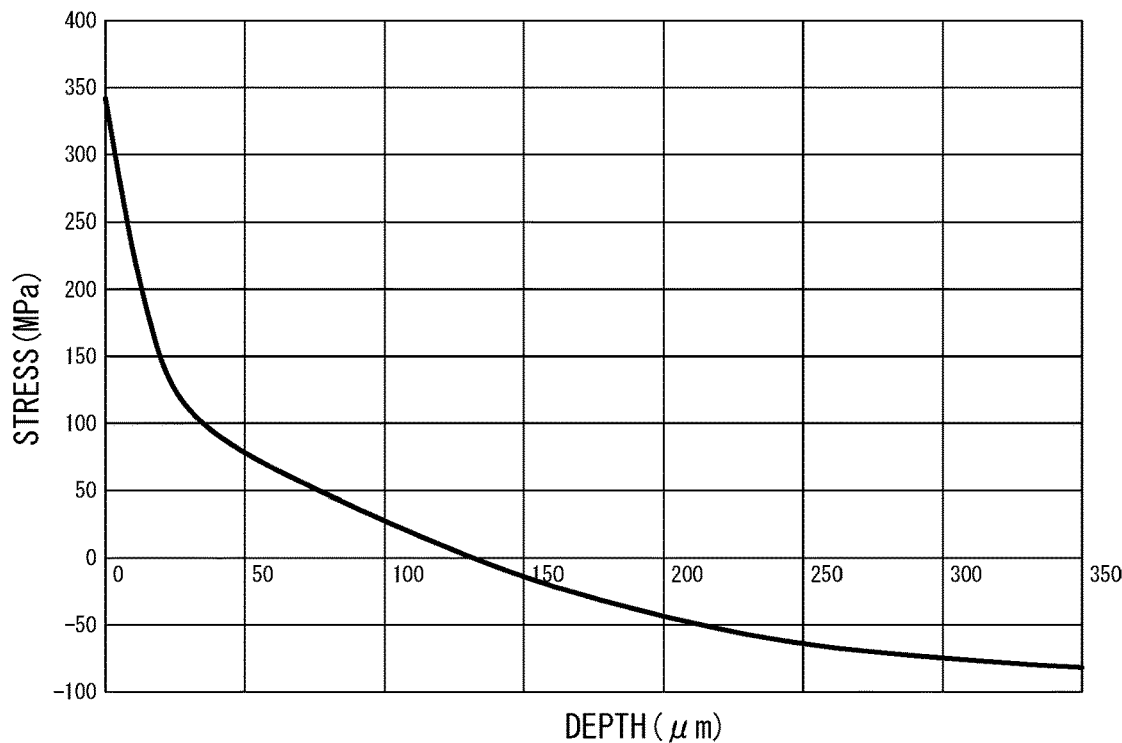
FIG. 7 is a graph for showing the stress profile of each of tempered glasses according to Samples Nos. 1 to 3 after a first ion exchange step.
Figure 8:
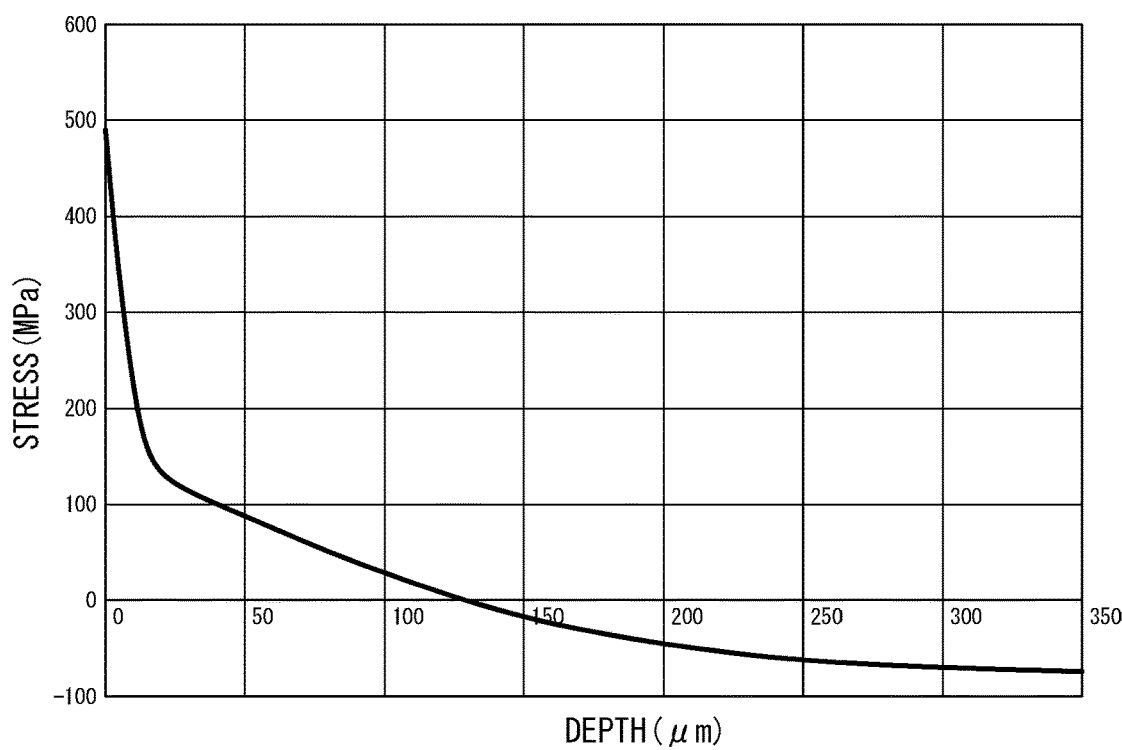
FIG. 8 is a graph for showing the stress profile of each of tempered glasses according to Samples Nos. 4 to 7 after the first ion exchange step.

All Examples (Samples No. 1 to No. 7) have the first inflection point C and the second inflection point D. However, as shown in FIG. 7, the stress profile of each of Samples Nos. 1 to 3 after the first ion exchange step does not have any inflection point formed therein. Similarly, as shown in FIG. 8, the stress profile of each of Samples Nos. 4 to 7 after the first ion exchange step does not have any inflection point formed therein. This also shows that the inflection points in the stress profiles of all Examples (Samples No. 1 to No. 7) are formed in the second ion exchange step.

Figure 9:
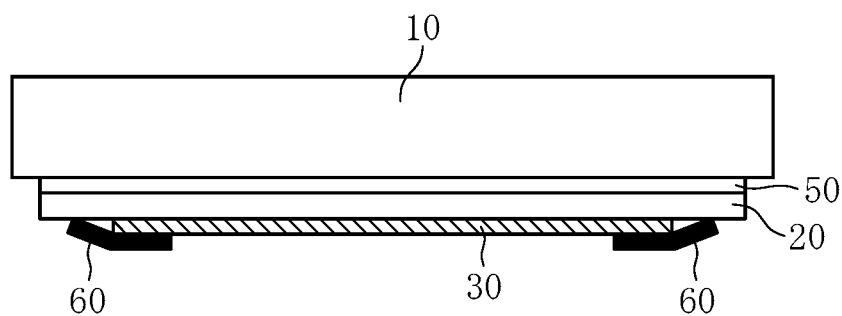
FIG. 9 is a schematic view for illustrating a drop test method in Examples of the present invention.
Figure 9:
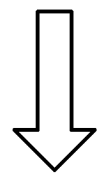
Figure 9:
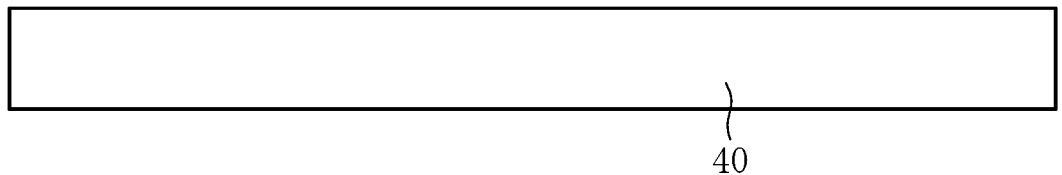

The simulated casing drop strength represents, as illustrated in FIG. 9, the height at which a glass sample 20 formed of the tempered glass 1 breaks when dropped, onto a surface plate 40 made of iron, in a state in which a simulated casing 10, the glass sample 20, and sandpaper 30 are laminated in the stated order. Specifically, first, the simulated casing 10 is bonded to one main surface of the glass sample 20 processed so as to have a size measuring 65 mm wide by 130 mm long and the thickness T shown in Table 1. The simulated casing 10 is a polycarbonate-made thick sheet member imitating a personal digital assistant, measuring 70 mm wide by 140 mm long by 8 mm thick, and having a mass of 110 g. The simulated casing 10 and the glass sample 20 are bonded by interposing an optical pressure-sensitive adhesive film 50 having a thickness of 150 μm therebetween.

Next, the sandpaper 30 is bonded to the other main surface (main surface on the opposite side to the main surface bonded to the simulated casing) of the glass sample 20 so that a surface (surface on which an abrasive material is arranged) of the sandpaper 30 abuts thereon. The sandpaper 30 has the dimensions of a width of 60 mm and a length of 120 mm, and is placed at the central portion of the other main surface of the glass sample 20. At this time, the sandpaper 30 is placed so that peripheral edge portions of the glass sample 20 may project from the sandpaper 30. The thus projecting peripheral edge portions of the back surface (surface on which the abrasive material is not arranged) of the glass sample 20 are bonded to both end portions of the sandpaper 30 at a plurality of sites with a plurality of plastic tape pieces 60, to thereby bond the sandpaper 30 to the glass sample 20. The plastic tape pieces 60 each measure 19 mm wide by 10 mm long by 0.1 mm thick, and the bonded sites are the respective central portions of the short sides of the sandpaper 30. SiC SANDPAPER P180, P120, P100, and P80, different from each other in abrasive grain coarseness (grain size), manufactured by Riken Corundum Co., Ltd. were each used as the sandpaper 30, and the simulated casing drop strength was measured for each case.

The test body thus obtained was held in a horizontal posture so that the sandpaper 30 was directed downward, and the test body was repeatedly dropped toward the surface plate 40 while a drop height was raised until the glass sample 20 broke. In more detail, in the present application, a test was performed by: clamping the test body with a clamping part formed of an air cylinder; starting the dropping of the test body together with the clamping part; and releasing the clamping with the air cylinder at a position 20 cm above the surface plate 40 to drop the test body toward the surface plate 40 while causing the test body to maintain the horizontal posture. The sandpaper 30 was replaced with a new one every time one drop test was performed. The drop height was set as follows: the drop height was measured with respect to a height of 20 cm from the drop surface, and when the glass sample 20 did not break, the drop height was raised by 10 cm.

All Examples for each of which the simulated casing drop strength was measured (Samples No. 1 to No. 7) had higher simulated casing drop strengths than Comparative Example (Sample No. 8), and hence were recognized to have high impact resistances.

INDUSTRIAL APPLICABILITY

The tempered glass of the present invention may be utilized as a part for, for example, a cellular phone (in particular, a smartphone), a tablet computer, a digital camera, a touch panel display, or a large-screen television.

REFERENCE SIGNS LIST 1 tempered glass
2 compressive stress layer
3 tensile stress layer
10 simulated casing
20 glass sample (tempered glass)
30 sandpaper
40 surface plate
50 optical pressure-sensitive adhesive film
60 plastic tape piece
C first inflection point
D second inflection point

The invention claimed is:
1. A tempered glass having a surface and a thickness T, wherein, when a compressive stress of the tempered glass is represented by a positive number and a tensile stress thereof is represented by a negative number,
   a maximum value of the compressive stress at the surface is 400 MPa or more,
   a stress profile of the tempered glass obtained by measuring a stress in a depth direction from the surface has inflection points at each of which a second derivative of the stress profile becomes zero between the surface and a depth equal to a half of the thickness T, and
   the compressive stress at a first inflection point present at a position closest to the surface among the inflection points is 150 MPa or less,
   wherein the inflection points comprise a second inflection point present at a position deeper than the first inflection point, and
   wherein $(\sigma1-\sigma2)/(d1-d2)$ is $-1.0$ MPa/μm or more, where σ1 represents the stress at the first inflection point, d1 represents a depth of the first inflection point from the surface, σ2 represents the stress at the second inflection point, and d2 represents a depth of the second inflection point from the surface.

2. The tempered glass according to claim 1, wherein the compressive stress at the second inflection point is 45 MPa or less.

3. The tempered glass according to claim 1, wherein the depth of the first inflection point from the surface is 50 μm or less.

4. The tempered glass according to claim 1, wherein the depth of the second inflection point from the surface is 60 μm or more.

5. The tempered glass according to claim 1,
wherein the stress profile has a zero stress point at which the stress becomes zero, and
wherein the zero stress point is present at a position deeper than 12% of the thickness T from the surface.

6. The tempered glass according to claim 5, wherein $S_{CS}/T$ is 16.0 MPa or less, where $S_{CS}$ (Mpa·mm) represents an integrated value of the compressive stress from the surface to the zero stress point.

7. The tempered glass according to claim 1, wherein a maximum absolute value of the tensile stress is 70 MPa or less.

8. The tempered glass according to claim 1,
wherein the thickness T falls within a range of 0.3 mm or more and 1.0 mm or less,
wherein the tempered glass has a front main surface, a back main surface, a first end surface, and a second end surface,
wherein the surface is one of the front main surface, the back main surface, the first end surface, or the second end surface, and
wherein the stress profile is in each of the front main surface, the back main surface, the first end surface, and the second end surface.

9. The tempered glass according to claim 1,
wherein the thickness T falls within a range of 0.45 mm or more and 0.85 mm or less,
wherein the maximum value of the compressive stress at the surface falls within a range of 700 MPa or more and 850 MPa or less,
wherein a maximum absolute value of the tensile stress falls within a range of 42 MPa or more and 65 MPa or less,
wherein the stress profile has a zero stress point at which the stress becomes zero,
wherein the zero stress point is present at a position within a range of 17% or more and 25% or less of the thickness T from the surface, and
wherein the compressive stress at the first inflection point falls within a range of 30 MPa or more and 80 MPa or less.

10. The tempered glass according to claim 1, wherein the tempered glass comprises as a glass composition, in terms of mass %, 40% to 70% of $SiO_2$, 10% to 30% of $Al_2O_3$, 0% to 10% of $B_2O_3$, 2% to 11% of $Li_2O$, 5% to 25% of $Na_2O$, 0% to 10% of $K_2O$, 0% to 6% of MgO, and 0% to 20% of $P_2O_5$.

11. A method of producing a tempered glass having a surface and a thickness T according to claim 1,
the method comprising:
a first ion exchange step of bringing a glass to be tempered containing $Li_2O$ and $Na_2O$ into contact with a first molten salt containing a Na ion to introduce the Na ion into the glass to be tempered; and
a second ion exchange step of bringing, after the first ion exchange step, the glass to be tempered into contact with a second molten salt containing a Li ion and a K ion to desorb at least part of the Na ion from the glass to be tempered, and to introduce the K ion into the glass to be tempered,
wherein the first ion exchange step and the second ion exchange step are performed so that a stress profile of the tempered glass obtained by measuring a stress in a depth direction from the surface with a compressive stress being represented by a positive number and a tensile stress being represented by a negative number has inflection points each of which a second derivative of the stress profile becomes zero between the surface and a depth equal to a half of the thickness T.

12. The method of producing a tempered glass according to claim 11, wherein the inflection points are formed in the second ion exchange step.

\* \* \* \* \*